United States Patent [19]

Hesler et al.

[11] 4,202,031
[45] May 6, 1980

[54] STATIC INVERTER EMPLOYING AN ASSYMETRICALLY ENERGIZED INDUCTOR

[75] Inventors: Joseph P. Hesler, Liverpool; Samuel M. Korzekwa, Baldwinsville; Robert J. McFadyen, Syracuse, all of N.Y.

[73] Assignee: General Electric Company, Syracuse, N.Y.

[21] Appl. No.: 956,578

[22] Filed: Nov. 1, 1978

[51] Int. Cl.² .................................... H02M 7/48
[52] U.S. Cl. .................................... 363/97; 363/49; 363/18; 331/113 A; 336/172
[58] Field of Search .................... 363/18–21, 363/97, 123–124, 131, 49, 75, 90–91, 93; 331/113 A, 112; 336/171, 172

[56] References Cited

U.S. PATENT DOCUMENTS

| | | | |
|---|---|---|---|
| 2,284,406 | 5/1942 | D'Entremont | 336/172 |
| 3,914,680 | 10/1975 | Hesler et al. | 363/97 |
| 4,002,999 | 1/1977 | Hesler et al. | 331/113 A |
| 4,004,251 | 1/1977 | Hesler et al. | 363/15 X |
| 4,135,234 | 1/1979 | Forge | 363/21 |

Primary Examiner—J. D. Miller
Assistant Examiner—Peter S. Wong
Attorney, Agent, or Firm—Richard V. Lang; Carl W. Baker

[57] ABSTRACT

A static inverter employing an inductor and an electrical gain element for intermittent assymetric energization of the inductor from a dc source is described. Reliable intermittent operation of the gain element, typically a power transistor, is achieved by use of three feedback windings which in response to saturation of a branch of the core of the inductor but before full core saturation, discontinue regenerative feedback and then apply degenerative feedback. This turn off mechanism protects the transistor from high current stresses. Passive means are provided such as a capacitor for momentarily storing the energy or diode means for coupling the energy back to the source or to the load to protect the transistor from the high voltage surge and the energy release when current flow in the inductor is interrupted. Energy stored in the capacitor may be used for transistor commutation.

18 Claims, 9 Drawing Figures

STATIC INVERTER EMPLOYING AN ASSYMETRICALLY ENERGIZED INDUCTOR

The present invention represents an extension of the inventions described in U.S. Pat. No. 4,002,999 entitled "Static Inverter With Controlled Core Saturation" and U.S. Pat. No. 3,914,680 entitled "Static Inverter", of Messrs. Joseph P. Hesler and Samuel M. Korzekwa and dealing with symmetrical two or four transistor inverters, which patents are assigned to the present Assignee.

BACKGROUND OF THE INVENTION

1. Field of the Invention

The invention relates to static inverters for converting electrical energy in the dc form to electrical energy in the ac form through static means. The present invention lies in the class of inverters in which the dc source produces a current through a single gain element connected in series with a primary winding of a power transformer and producing an ac output in the transformer secondary as the gain element is turned on or off. The invention represents a modification of known blocking oscillator configurations.

2. Description of the Prior Art

Static inverters of the class employing a dc source, a switching semiconductor device and a transformer are well known. The arrangements exist in either free running or the driven form. In either form, feedback windings may be used to control the semiconductor device. Recently, as represented by U.S. Pat. Nos. 3,914,680 and 4,002,999 to Hesler et al and assigned to the Assignee of the present invention, the transformer properties have been tailored to the requirements of the semiconductor in the inverter application, in particular to maximize the switching efficiency and to avoid full core saturation which unduly stresses the semiconductor devices. In both cited patents, the main core is provided with apertures, each of which divides the core into two localized branches. One branch is designed to saturate first, and upon saturation to reduce the regenerative and increase the degenerative feedback applied to the transistor so as to prevent full core saturation. The patented circuits have led to a reduction in the cost of such inverters, and a substantial improvement in the switching efficiency.

The present invention represents a further improvement on such arrangements in application to single transistor inverters in which energization is applied assymetrically to the transformer. In switching one device off without turning another one on, a new energy management problem is created. The high voltage surge may be very high, creating appreciable danger to the switching device, and at the same time a new mechanism is required for insuring that the transistor will come back on, after a period of non-conduction.

SUMMARY OF THE INVENTION

Accordingly it is an object of the present invention to provide an improved static inverter employing an assymetrically energized inductor.

It is a further object of the present invention to provide an improved static inverter in which assymetric energization is produced requiring a single current switching gain element.

It is an additional object of the present invention to provide an improved assymetrically energized static inverter having improved means for protecting the current switching gain element when current in the inductor is interrupted.

It is still another object of the invention to provide an assymetric static inverter having improved commutation means for the current switching gain element.

These and other objects of the invention are achieved in a novel static inverter comprising an inductor and an electrical gain element for intermittent assymetric energization of the inductor from a dc source. The inductor has a core of substantially linear magnetic material having a closed main magnetic path of approximately uniform cross-section, with a small aperture in a segment of the path which partitions the cross-section into two branches and creates a low reluctance closed flux path. An air gap in the main core is normally desirable. A primary winding and a secondary power winding are provided encircling the full core cross-section respectively for generating flux around the main magnetic path and for deriving an alternating output.

For conduction control of the gain element, three feedback windings are provided, the first, a feedback control winding encircling one of the branches, generates a flux around the low reluctance closed path having the same direction as the main flux in a first branch and an opposite direction in the second branch. In addition, a second and a third feedback winding are provided respectively encircling the first and second branches.

The electrical gain element is typically a junction transistor having base, emitter and collector electrodes. The primary power winding, the feedback control winding, and the transistor are serially connected between the dc input terminals so that normal transistor conduction causes flux along the main magnetic path in a first direction, storing magnetic energy, and non-conduction causes the main flux to collapse, releasing magnetic energy and creating a high voltage surge.

The second and third feedback windings are serially connected between the control and common electrodes, the first winding being connected in a sense to increase and the other winding being connected in a sense to decrease transistor conduction when the flux in the main magnetic path increases in the first direction. The two windings are in the same sense in respect to flux encircling the low reluctance flux path. The three feedback windings thus form a current transformer providing feedback in a sense to increase gain element conduction as the main flux in the first direction increases until saturation of the first branch prevents further current transformer action. When first branch saturation occurs, preventing further induction in the second feedback winding, a voltage is induced in the third feedback winding in a sense to turn off the transistor.

Finally, passive means are provided for protecting the gain element from the inductive surge and the energy released when the gain element is turned off. A capacitor is one such passive means, and another includes a diode used to return energy to the power supply or to the load.

When the passive protection means is a capacitor connected in shunt with the inductor to form an LC tank circuit, the capacitor stores energy released from the inductor when the transistor is turned off and returns energy to the inductor to turn the transistor back on after a suitable delay to continue the regenerative cycle. The transistor turn on mechanism involves charging the capacitor from the inductive discharge, and then discharging the capacitor through the inductor which forward biases the transistor output junction, producing abnormal forward conduction. Abnormal forward conduction establishes a reverse magnetization around the low reluctance flux path, storing energy releasable in a regenerative sense and creating stored charge in the transistor. These institute normal transistor conduction when normal inverse collector voltage is restored at the end of the capacitive discharge.

As a further transistor protection measure during abnormal forward conduction, a first diode is provided connected in shunt with the base and emitter electrodes of the first transistor.

For noise immunity, a second diode and a capacitor are provided. The second diode is connected in series in the same sense as the first diode, both diodes being connected in shunt with the base and emitter electrodes of the first transistor. The capacitor is connected in shunt with the second diode and has sufficient capacity to apply a back dc bias once the regenerative cycle is established.

Oscillations may be started by a dc mechanism comprising a resistance connected between a dc source terminal and the base electrode. Also, oscillations may be started by a trigger pulse applied to a starting winding encircling one of the branches or to the base electrode.

While the static inverter may be free running, it may also be non-free running. Non-free running or driven operation is achieved by more tightly coupling the load, and then supplying a trigger to turn the transistor on each time conduction is desired.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawing in which:

DESCRIPTION OF THE PREFERRED EMBODIMENTS

Figure 1:
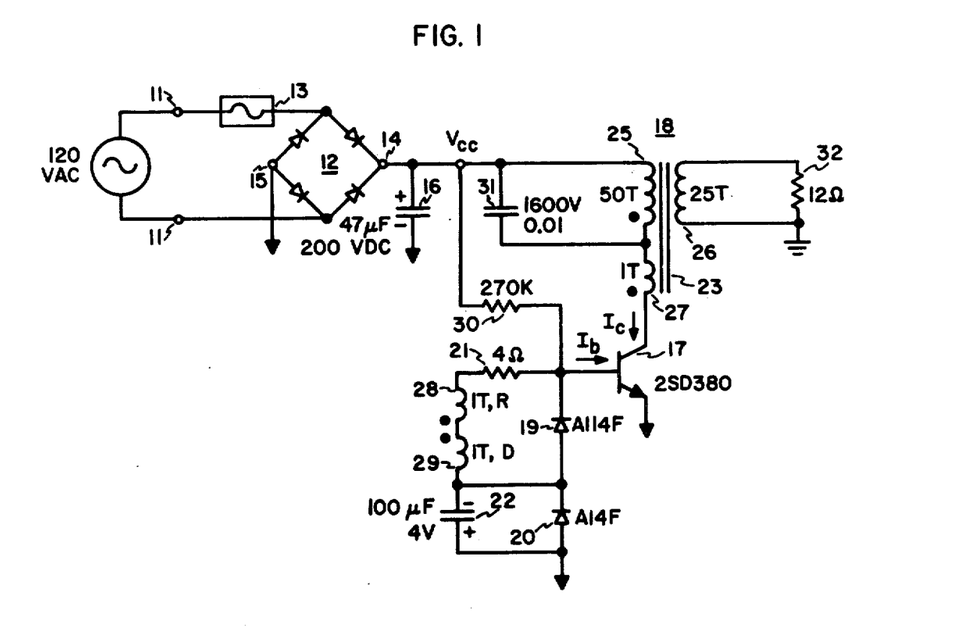
FIG. 1 is an electrical circuit diagram of a static inverter employing a transistor in a self-starting, free-running blocking oscillator configuration and utilizing a transformer having an apertured core through which control windings are passed for facilitating optimum switching of the transistor.

Referring now to FIG. 1, a novel free-running, self-starting blocking oscillator is shown coupled between a dc source and a load, the oscillator performing the function of static dc to ac inversion. The dc source comprises an ac supply of 120 volt 60 hertz, whose terminals are shown at 11, a fuse 13, a rectifier full wave bridge 12 and a filter capacitor 16. The ac supply terminals 11 are connected through the fuse 13 to the ac input terminals of a bridge rectifier 12, which provides full wave rectified dc at the respectively positive and negative output terminals 14 and 15. The negative output terminal (15) is defined as ground and the positive output terminal (14) is connected to one terminal of a filter capacitor 16. The other capacitor terminal is connected to ground. The filtered dc voltage, typically 155 volts, which appears between the bridge output terminals 14 and 15, is applied to energize the novel static inverter. The load for the static inverter is shown at 32. As illustrated, the load may have an independent ground. It has a dc impedance of 12 ohms, and consumes 100 watts at 40 kilohertz. The static inverter completes the figure.

The novel inverter comprises a power transistor 17, a power transformer 18, and sundry circuit elements 19, 20, 21, 22, 30, 31, associated with starting and control of the transistor 17, the combination functioning as a self-starting, free-running blocking oscillator.

Figure 2A:
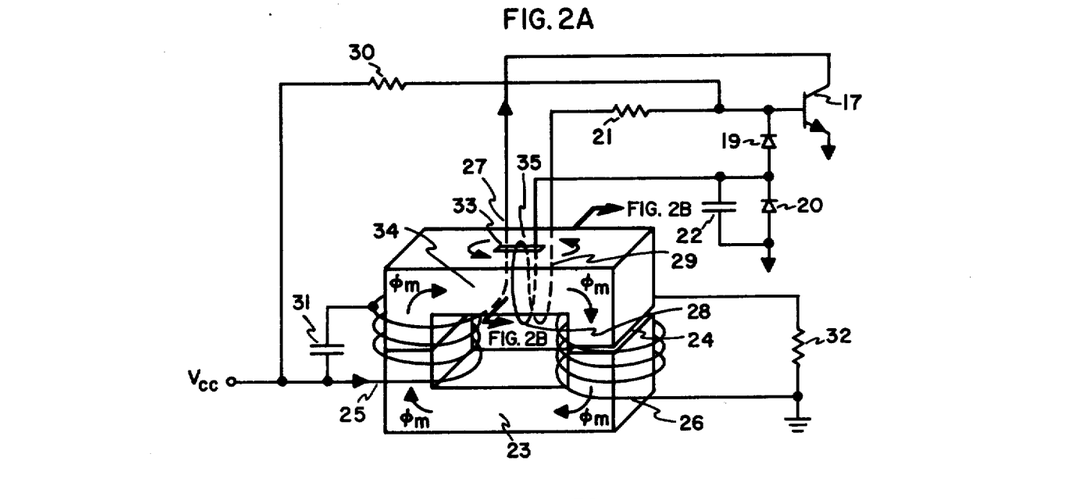
FIG. 2A is a simplified representation of the transformer employed in the FIG. 1 embodiment, the field relationships within it and the immediate electrical connection to it.
Figure 2B:
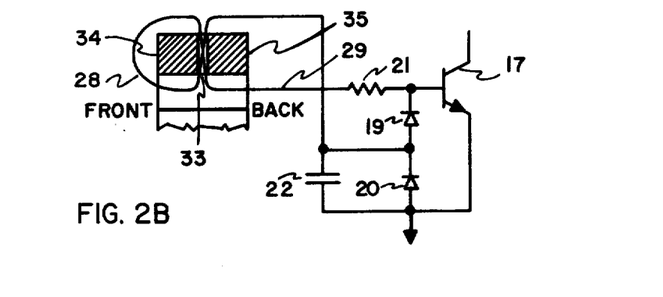
FIG. 2B is a section taken through the aperture.

The physical construction of the power transformer 18 and its immediate electrical connections are best seen in FIGS. 2A and 2B. The transformer has a core with five associated windings 25–29. The ferrite core 23 comprises two "C" cores assembled in a closed configuration and forming the main magnetic flux path. An air gap on one side (or both sides) introduces additional linear reluctance in the main flux path. The design has a substantial primary to secondary leakage inductance. An aperture 33 is provided in one leg of one "C" core displaced from either joint. The aperture divides the core cross-section into two localized branches 34, 35. The absence of a joint permits a closed flux path of low reluctance about the aperture—a virtual toroid. The aperture 33 is of rectangular cross-section, but may also be circular or of other configurations, the shape not being critical. Preferably, it is small to maintain adequate core cross-section while being large enough for insertion of the necessary windings (27, 28, 29).

The air gap introduces additional linear reluctance in the main flux path to minimize the offset due to dc current drive. It also reduces remanence, making more inductive energy available for commutation when necessary.

The power transformer has a primary winding 25 and a secondary winding 26 providing efficient power transfer with substantial leakage inductance. The primary winding 25 is of fifty turns wound on the left leg of the core and embracing the full core cross-section. When current flows in the primary winding it generates a flux around the main flux path, including the two branches at aperture 33. The secondary power winding 26 is of twenty-five turns wound on the right leg of the core over the joint having an air gap. It also embraces the full core cross-section and couples to the flux flowing around the main flux path. The disposition of primary and secondary windings on opposite legs of the core and core proportions are designed to provide increased primary to secondary leakage inductance, a property which is useful in developing a large inductive voltage surge useful in commutation of the blocking oscillator.

The power transformer has three feedback windings (27, 28, 29) which may either aid or oppose transistor conduction depending upon the condition of saturation of a branch at the aperture 33. The winding 27 is the primary feedback winding exercising a control function and the windings 28 and 29 are secondary feedback windings. All three feedback windings are of a few turns, typically one or two, and each are led through the aperture 33 so that each embraces only one branch of the aperture. The primary feedback control winding 27 causes a flux to circulate about the low reluctance path around the aperture 33. When this flux is combined with the main flux, the branch in which the two fluxes add (branch 34 in FIG. 2A) will saturate in the normal conduction phase of the blocking oscillator. The other branch, (branch 35, FIG. 2A) in which the fluxes are of opposite sense, will ordinarily never saturate. Which branch saturates is established by the sense of the feedback control winding 27 and the point at which saturation occurs is established by the turns ratio and the impedance in the control circuit. The feedback windings 28 and 29 encircle the core branches 34 and 35, respectively, and are serially connected so as to form a figure eight as seen in FIG. 2B. This disposition and interconnection of secondary feedback windings 28 and 29 causes the induction of voltages in the same sense when the flux circulates around the aperture 33. Thus, the primary control winding 27 and feedback windings 28 and 29 form a current transformer having a one turn primary and a two turn secondary causing the current in the secondary feedback winding to be approximately half that of the primary feedback winding. Should branch 34 saturate, however, or either branch for that matter, the low impedance path for flux about the aperture is substantially interrupted. The virtual toroid destroyed, and current transformer feedback action is suspended. The feedback windings 28 and 29 are designed to induce conduction influencing voltages suitable for transistor control as the main flux changes in the core branches 34 and 35. Assuming that neither branch is saturated, increasing main flux induces a voltage in one sense in the winding 28 and in the opposing sense in the winding 29 since the two are wound in the opposite sense. Since they are serially interconnected, the two opposing voltages due to increasing main flux may substantially cancel, particularly if the aperture 33 is centered and the branches 34, 35 are symmetric. Should branch 34 saturate, no further voltage increases will occur in the winding 28. As the main flux increases, any additional voltage developed in the other feedback winding 29 will be unopposed.

As will be explained, the feedback windings 28 and 29 are interconnected with the input electrodes of the power transistor 17 in a sense that current transformer action occurring when the transistor is conducting normally and before saturation of branch 34 produces a conduction aiding or regenerative feedback. After the first branch (34) saturates, the feedback due to winding 29 is conduction opposing or degenerative. These two mechanisms are useful in effecting an efficient control of the transistor 17 in blocking oscillator operation.

The windings and circuit elements of the static inverter are interconnected as follows: The path for dc input current to the inverter comprises the transformer primary winding 25, the primary feedback control winding 27, and the transistor 17 in series. The collector of transistor 17 is coupled through the serially connected windings 25 and 27 to the positive bridge terminal 14 where the $+V_{cc}$ supply voltage appears. The emitter of transistor 17 is coupled to ground as is the negative terminal 15 of the bridge, thus completing the primary current path. Due to the serial connection, primary current flow is dependent on the state of conduction of the transistor 17. Intermittent conduction by the transistor 17 causes intermittent primary current flow in the primary winding 25, a corresponding variation in the flux in the core 23 and a corresponding induction of an alternating voltage in the secondary winding 26. As earlier noted, the load winding 26 is loosely coupled to the primary winding 25 as a result of the disposition of the primary and secondary windings on mutually remote legs of the magnetic core 23 and the core configuration. A capacitor 31 shunts the primary winding 25 and forms a parallel resonant circuit. As will be explained, the capacitor 31 absorbs a portion of the energy released when primary current in the transformer 18 is interrupted by non-conduction of the transistor thus protecting the transistor from immediate stresses, and aiding in restarting it at a later instant.

Continuing with the circuit connection of the inverter, the base of the transistor 17 is connected to a starting and control network consisting of the remaining circuit elements: resistance 30, diodes 19 and 20, secondary feedback windings 28, 29, resistance 21 and capacitor 22. The resistance 30 is connected between the positive bridge terminal 14 and the base of transistor 17. The transistor base is also connected to the cathode of the diode 19, the anode of which is coupled to the cathode of diode 20. The anode of diode 20 is coupled to ground. The resistance 21, the secondary winding 28 and the secondary winding 29 are serially connected in the order recited between the cathode and anode of diode 19. The capacitor 22 is connected in shunt with the diode 20.

The transistor starting circuitry may be regarded as primarily comprising the resistor 30 and secondarily the diodes 19 and 30 associated with the base electrode of transistor 17. The resistor 30 has a large value (270K) selected to allow a 0.5 milliampere current to flow from the positive bridge terminal 14 into the base circuitry. The current flows into the capacitor 22 initially. When the capacitor 22 is charged to the forward conduction potential of the base-emitter junction, the current into the capacitor stops and current flow into the base begins. Diversion of any further current away from the base during starting is prevented by the diode 20, which is poled to oppose this direction of dc current flow, and the capacitor 22, which blocks direct current flow when charged.

The operating point of the transistor 17 and more particularly its base to emitter potential is set by the capacitor 22 operating in conjunction with the diode 20. Once started, and operating normally, the collector-base junction of transistor 17 becomes forward biased on cyclical negative swings of the transformer primary voltage. In this condition, current is drawn from ground through diodes 19 and 20, charging the ungrounded terminal of capacitor 22 negatively with respect to ground. The capacitor has sufficient capacity to maintain this charge from cycle to cycle and applies an approximately $-0.7$ volts dc bias to the base of the transistor 17. This negative bias insures cut-off operation of the transistor during flyback but is often optional.

The primary feedback control winding 27, acting in concert with the secondary feedback windings 28 and 29 provides a controlled feedback which together with other circuit parameters establishes the conditions for oscillation of the blocking oscillator. In addition, it optimizes the drive applied to the transistor input electrodes in such a manner as to maximize switching efficiency with a minimum stressing of the transistor 17.

The blocking oscillator of FIG. 1 passes through four phases in a normal oscillatory run cycle. The identifying characteristics of these phases are illustrated in the three waveforms of FIG. 3 to which reference will be made as the discussion progresses. The onset of oscillation is anomalous in that energy is not distributed to the energy storage elements, and commences with a buildup of normal conduction in the transistor 17. This corresponds most closely to Phase II.

During normal transistor conduction (the input junction is forward biased and the collector to emitter voltage is sufficiently low to cause "saturation" and reduced current gain - but the direction of collector current flow is normal), corresponding to the Phase II, the inverter primary current flows serially through the transformer primary winding 25, exiting at the dotted terminal, and into the collector electrode. As shown in FIG. 2, assuming that a current flow in the primary winding 25 generates a clockwise primary magnetization flux around the core 23 (viewing the front face of the core), the primary feedback control winding 27 passing up through aperture 33 will generate a counter-clockwise flux around the aperture 33 (as viewed looking down at the top leg of the core). The main and control fluxes add in the branch 34 on the front side of the aperture 33, and subtract in the branch 35 on the back side of the aperture, thus causing a large flux in the branch 34 and a small flux in the branch 35. As previously noted, the secondary winding 28 is coupled about the branch 34, while the secondary winding 29 is coupled about the branch 35. In respect to the main flux, the voltages induced in windings 28 and 29 subtract and substantially cancel one another to produce a negligible output. In respect to the control flux, the voltages induced add, and produce the regenerative current transformer action described earlier. During the period that collector current is increasing and the branch 34 still unsaturated, substantial regenerative current feedback is applied to the base electrode of transistor 17. The mechanism is an essentially current transformer action with a low impedance termination on winding 28 relative to the source impedance. The secondary feedback winding 28 is connected in series with the secondary feedback winding 29 and capacitor 22, shunted by diode 20, between the base and emitter of transistor 17. During Phase II, both windings 28 and 29 are active, and the capacitor and diode 20 provide a low impedance path to the emitter for the current induced in the windings 28 and 29. The windings are poled to increase base current as the collector current increases, and produce a substantially linear increase in collector current. The effect is regenerative and the transistor conducts the primary current demanded by the inductance of the transformer and the applied voltage. As the flux grows in the branch 34, that branch saturates and regenerative current feedback ceases.

Cessation of regenerative feedback in winding 28 initiates Phase III, at the end of which conduction of the transistor is terminated. Under the influence of the applied voltage, the inductance, and the presence of stored charge, the collector current will continue to increase past saturation of the first branch, even after the regenerative drive terminates. When saturation of the branch 34 has occurred, increases in the main flux now must flow into the second branch 35 and a feedback voltage is induced in the winding 29 (unopposed by induced voltage in winding 28). The winding 29 is connected in circuit with the base electrode in a sense to decrease base current, to decrease collector current conduction and to achieve a degenerative effect. These conditions produce voltage transformation between the windings 25 and 27 acting as the primary and winding 29 acting as the secondary. The saturation of branch 34 precludes circulating flux around aperture 33 and increases the reluctance to the flux created by winding 27. The effect of the flux due to winding 27 may normally be neglected in view of its proportionately few turns in respect to primary winding 25. Ideally, the flux from winding 27 adds to the main flux in the unsaturated branch and increases the effective turns by one turn. The winding 28 is still serially connected with winding 29, but assuming full saturation of branch 34, no further voltage is induced in winding 28, and it serves as a low impedance connection of the voltage induced in winding 29 to the base circuit of transistor 17. When voltage transformer action is taking place, the intensity of the applied degenerative voltage may be controlled by the small serially connected resistance 21. Under the influence of secondary feedback winding 29, the base drive back biases the input junction. After stored charge has been removed, conventional transistor conduction ceases. The resistance 21 sets the rapidity of the turn off.

With the transistor 17 non-conductive, Phase IV or the flyback phase of the regenerative cycle commences. At the moment before turn off, the capacitor 31 is charged to the dc source potential (i.e. one capacitor terminal is at $V_{cc}$; the other capacitor terminal is slightly above ground since transistor 17 is conductive; and the current in the inductor is directed into the transistor at a maximum directly proportional to the B+ potential, inversely proportional to the inductance, and directly proportional to the duration of the prior conduction period:

$$I_{T_1} \approx \frac{(V_{cc}) \Delta T}{L} \qquad (1)$$

At the instant ($T_1$) that the transistor becomes non-conductive, the energy stored in the tank circuit is free to interchange in a sinusoidal manner at a frequency determined by the LC product, and at an amplitude set by the initial conditions and the circuit losses. At the mid-point of the flyback interval ($T_2$), the collector connected terminal of the inductor and the capacitor reach the highest positive potential (+500V) with respect to $V_{cc}$ and the current from the $V_{cc}$ source terminal into the inductor goes through zero. At this point, the current flow reverses, now flowing into the inductor and toward the $V_{cc}$ terminal. The current in the tank circuit reaches a reverse maximum at the end of Phase IV ($T_3$), with the capacitor charged to $V_{cc}$, as at the beginning of Phase IV.

Phase I is initiated as the collector voltage tries to swing negative with respect to ground potential, forward biasing the collector base junction. The transistor, quiescent through Phase IV, now conducts in a reverse sense and clamps the tuned circuit to near ground potential. The path to ground includes serially connected diodes 20 and 19 poled for easy current flow for negative current, which shunt the input junction of transistor 17 and serially connected windings 28, 29 and capacitor 22. (The diode 19 protects the emitter base junction of transistor 17 from breakdown during the period of negative current flow.) The three forward biased junctions preclude the collector from falling more than 3 diode drops below ground, and the collector potential is effectively clamped to this value. The current in the inductor $i_{(t)}$, starting at a negative maximum $I_{T3}$ will now gradually reverse under the influence of $V_{cc}$ and L:

$$I_{(L)} \approx \frac{V_{cc} \cdot T}{L} - I_{T3} \tag{2}$$

From the energy standpoint, at the transition into flyback (T1), maximum current flow into the inductor from the bias source $V_{cc}$ creates a magnetic field in the inductor representing stored energy. The cessation of conduction by the transistor allows the energy stored in the magnetic field to be converted into a current flowing into the capacitor and charging it. The capacitor reaches full potential at instant $T_2$, at which time the energy stored in the capacitor begins to flow back into the inductor, reaching a maximum current in a reverse sense and creating an accompanying energy storing magnetic field at time $T_3$. During Phase IV, the transistor is quiescent and extracts no energy. The load, however, which is loosely coupled, draws away energy, and circuit losses in the tank circuit draw away some more energy.

The energy returned to the inductor at time $T_3$ is now used to cause the transistor to conduct in a reverse to normal sense, a process which creates stored charge in the transistor and which carries the transistor through Phase I into Phase II. During the abnormal collector current flow in Phase I, the core which has been set in a reverse magnetic state, releases energy in an attempt to maintain the initial current $(-I_{T3})$. This current, flowing through windings 27, 28, causes the flux about the aperture 33 to switch in a direction opposite to that in Phases II and III. This flux switching produces a counter emf which must be overcome in the collapse of the main core flux, which dissipates some of the stored energy in the inductor. Throughout Phase I, also, some dissipation is due to the presence of the load, purposefully loosely coupled. At the end of Phase I, the reverse current flow has deposited stored charge carriers in the transistor junction, which remain momentarily after the cessation of Phase I, to insure renewal of the regenerative cycle. At the zero current crossover ($T_4$), the transistor starts normal conduction aided by stored charge in the junction, and the circuit transitions back into Phase II, where full regenerative action takes place. A final, but substantially less significant factor favoring commutation and continuation of the free running mode is the forward dc bias applied to the input junction through resistance 30.

Figure 3:
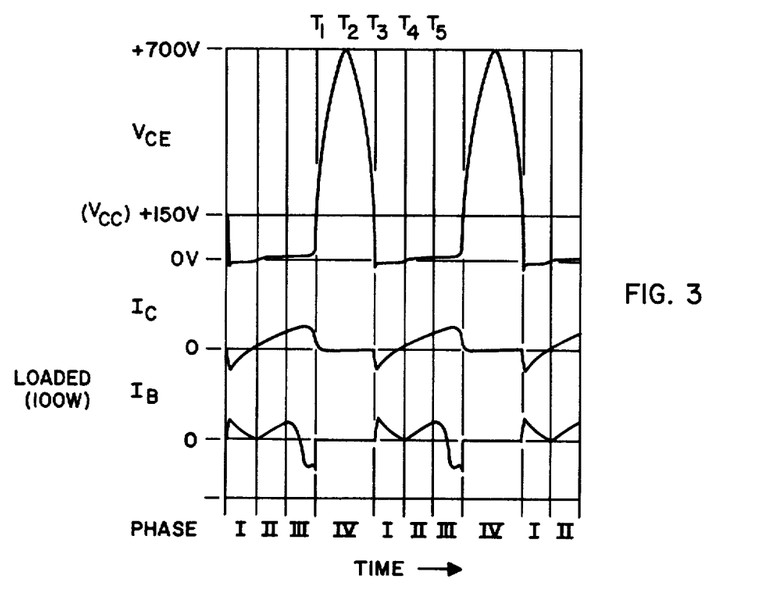
FIG. 3 is an illustration of the waveshapes useful in explaining the operation of the self-starting, free-running blocking oscillator of FIG. 1.

The wave shapes produced by a fully loaded circuit are illustrated in FIG. 3 and may be used to recapitulate the operation. The collector-emitter voltage $V_{ce}$, the collector current $I_c$ and the base current are plotted against a common time scale. The four phases are marked along the lowermost abscissa and the time instants $T_1$ to $T_5$ are marked along the upper margin. As the graph illustrates, Phase I is initiated by the sharp reduction of the collector voltage to a steady negative voltage of approximately $-2.1$ volts. The collector current during this period steps sharply to a negative value and then gradually decays through zero. The base current mirrors the collector current in a reversed sense since the base and collector currents are identical. In Phase II, normal transistor operation begins with the transistor normally conducting and the collector portential assuming a small positive value. Throughout Phase II, the collector current increases substantially linearly. In Phase II, the base drive which is proportional to the collector current due to current transformer action also climbs in proportion to the collector current. In Phase III, the collector voltage continues at a small positive value, while the collector current continues to rise until well into the Phase III and then begins to fall off sharply. In Phase III, the base drive starts at a high forward bias and begins to fall immediately toward zero and then reverses to a strong reverse bias near the middle of the phase, the reversal continuing until the phase is terminated. The reversal of base current turns off the transistor completely, ending Phase III and starting Phase IV. In Phase IV, a strong positive inductive swing in collector voltage commences, continuing to the peak voltage at the middle of the phase ($T_2$) and then subsiding to zero as Phase IV ends and Phase I commences. With the start of Phase I, the cycle repeats.

The FIG. 1 and FIG. 2 embodiment is a self-starting and free-running blocking oscillator designed to power a 100 watt load requiring a 40 kilohertz source. The actual circuit elements and transistor design parameters are identified in the two figures.

The circuit, as described, is both free running and self-starting. The free running condition is established by energy management. More particularly, the load is loosely coupled via a loosely coupled secondary winding remotely positioned from the primary winding permitting appreciable energy to be returned from the flyback pulse to re-establish conduction in the transistor. The self-starting feature is, as earlier noted, provided by the resistance 30. Loose load coupling permits the high positive voltage swing, when the transistor is quiescent, without extracting excessive energy from the resonant circuit. Excessive energy withdrawal by the load might preclude a strong enough negative swing to establish the necessary carriers in the transistor to initiate Phase I, and insure Phase II conduction.

For a practical circuit, in which it is desired to achieve high reliability and low cost, conservative operation of the transistor is mandatory. During the transfer of energy into the inductor as the transistor is turned on by the base drive applied by the feedback winding, the conduction might easily continue until the core is fully saturated. The effect of full core saturation would be to sharply reduce the impedance between the transistor and the dc source and to effect a high current stress condition upon the transistor which would tend to sharply reduce its operating life. The feedback provisions herein described reduce regenerative feedback at a point where the core has reached a predetermined flux level and then when that level is exceeded, produce a strong degenerative feed back, preventing full core saturation from ever occurring. The feedback can be programmed to provide an optimum transistor turn off. The programmed turn off, coupled with flyback voltage control discussed in the next paragraph reduces the likelihood of reverse secondary breakdown of the transistor switch at turn off. The end result is that when the circuit values are properly selected, both the core may be optimized to achieve maximum power output from a given amount of core material and a maximum life to the transistor is insured at that level, free from the stressing due to full core saturation.

A second factor in achieving high circuit reliability at low cost is the manner in which the energy stored in the inductor during the conduction cycle is prevented from generating excessive potentials so as to protect the transistor from bias potentials in excess of the transistor voltage ratings. In the FIG. 1 embodiment, the energy diversion is by means of the capacitor which stores the energy released by the inductor when the inductive field collapses. The capacitor then returns a desired fraction of the flyback energy to the transistor at a low conduction state in a sense which prevents excessive power dissipation in the transistor, so that when normal bias conditions are restored, the transistor is already conductive and ready to continue the cyclical pattern without intertuption.

Figure 4:
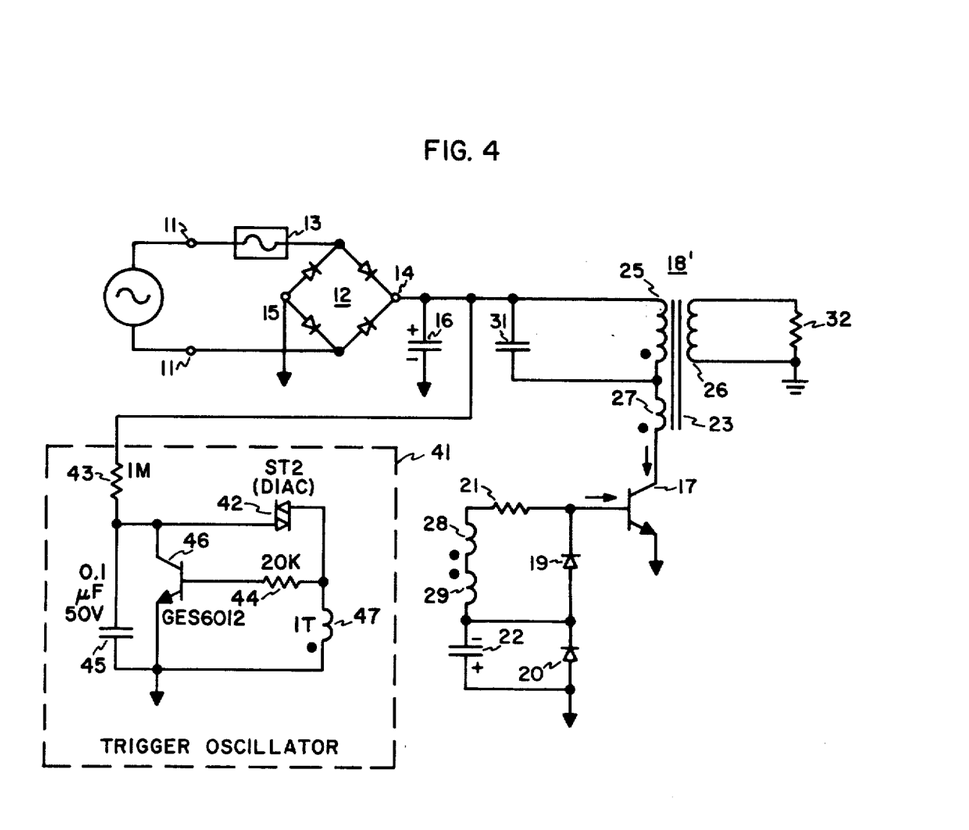
FIG. 4 is an electrical circuit diagram of a static inverter employing a single transistor in a free-running blocking oscillator configuration using a triggered start.

The self-starting free-running circuit illustrated in FIGS. 1 and 2 may be modified for triggered starting, the modified circuit remaining free-running. The modified circuit is illustrated in FIG. 4. It is like that in FIG. 1 except for the removal of the resistance 30 coupled between the positive bridge terminal 14 and the base of transistor 17 which provides a dc start and the substitution of a start circuit providing a trigger starting pulse. The triggered starting circuit is shown within the block 41 and consists of a diac 42, resistances 43,44, capacitor 45, transistor 46 and a starting winding 47 introduced through the aperture 33 of the transistor core. Magnetically coupled triggering permits the starting circuit 41 to be isolated from the main power circuit.

The triggered starting network 41 is a relaxation oscillator designed to produce a starting pulse for turning on the transistor 17 at the beginning of operation or restarting transistor 17 in the event that oscillations cease, and to be quiescent when transistor 17 is running normally. The relaxation oscillator comprises the resistance 43 and capacitor 45 serially connected between the positive bridge terminal 14 and ground. A diac 42 connected in series with the starting winding 47 shunts the capacitor 45. When the circuit is first energized, the capacitor 45 charges through resistance 43 to the point where the diac 42 fires, discharging the capacitor 45 through the start winding 47. The starting winding 47 is wound through the aperture 33 of the transformer core in a sense to turn on the transistor 17. After transistor 17 is turned on, Phase II operation is initiated and oscillations in general begin. The trigger circuit has a quenching circuit employing the transistor 46, winding 47 and resistance 44 to prevent the generation of spurious trigger pulses once transistor 17 is operating normally. The transistor 46 shunts the capacitor 45 having its emitter coupled to the grounded capacitor terminal and the collector coupled to the ungrounded capacitor terminal. The base of transistor 46 is connected through a large resistance 44 (20K) to the connection between the diac 42 and start winding 47. Once oscillations in transistor 17 are developed, the winding 47 becomes a sense winding causing the transistor 46 to conduct once in each oscillatory cycle of transistor 17 and thus preventing the capacitor 45 from charging to the point where the diac 42 will fire. Transistor 46 thus suppresses the generation of additional trigger starting pulses when transistor 17 is operating normally.

Figure 5:
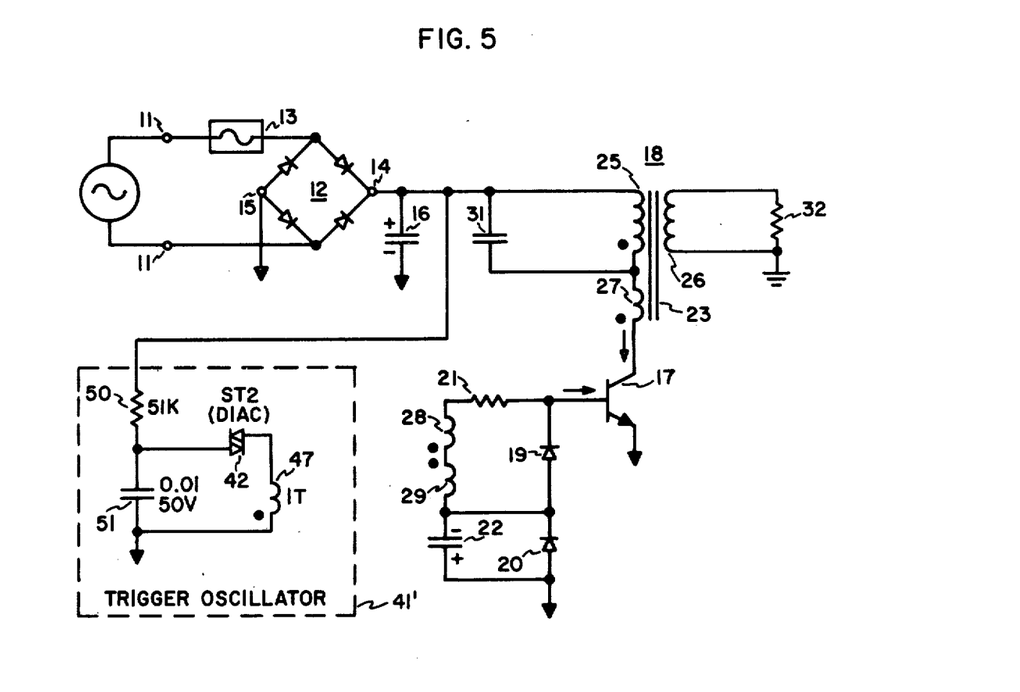
FIG. 5 is an electrical circuit diagram of a static inverter employing a single transistor in a repetitively triggered blocking oscillator configuration.

The blocking oscillator circuits in FIGS. 1 and 2 may be further modified to achieve both triggered start and triggered run operation as shown in FIG. 5. In FIG. 5, the circuitry associated with transistor 17 is as in FIG. 1 except for removal of the dc start resistance 30, the reduction or elimination of capacitor 31 and the redesign of the power transformer to tightly couple the load to the blocking oscillator. The tight coupling prevents self recommutation of the transistor, and permits control of each cycle by a separate trigger. This mode of control may be used for power control. Tight coupling is achieved by winding the primary and secondary power windings 25 and 26 on the same left leg of the complete core. The trigger circuit 41' of FIG. 5 has the same diac oscillator configuration as the FIG. 4 arrangement, but the time constant is shortened to produce operation at approximately 14 KHz. The quenching circuit is also removed. In the FIG. 5 configuration, Phase I is not as described before - but rather consists of an externally applied trigger pulse from the trigger oscillator, which causes the onset of Phase II leading to establishment of one complete cycle. Each cycle is repeated in the same manner with each trigger pulse.

Figure 6:
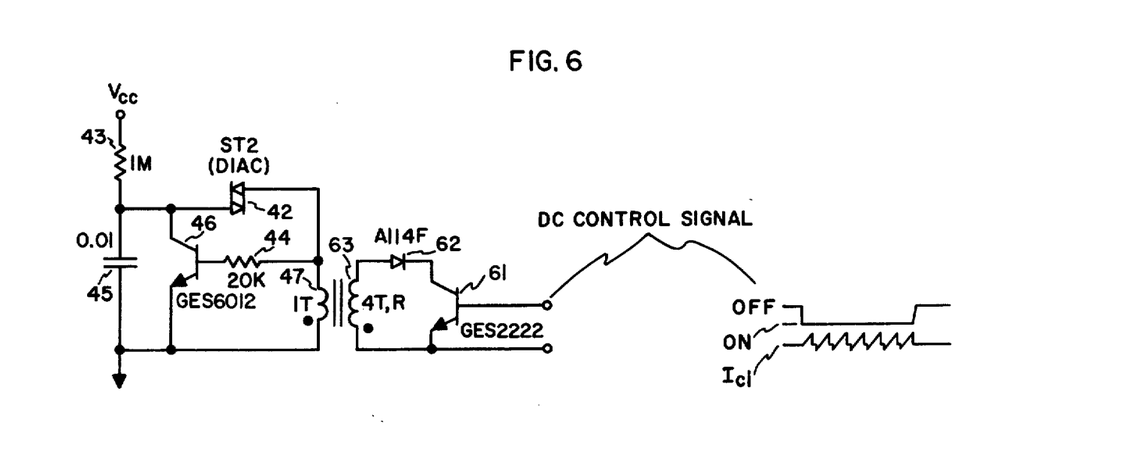
FIG. 6 is an electrical circuit diagram of a control network applicable to the FIG. 4 blocking oscillator in which a triggered start is provided and the free-running condition is modulated off or on by a dc control signal.

A modulating control circuit consisting of transistor 61, diode 62 and winding 63 shown in FIG. 6 and added to the FIG. 4 configuration, may be used to modulate the blocking oscillator. The prior described operation completely applies when the input to transistor 61 is low, i.e., it will initially start via the start trigger circuit, and then the blocking oscillator will free run. When the input to transistor 61 is high, the transistor 17 blocking oscillator will transition directly to Phase III and then be off. The emitter of the control transistor 61 is coupled to the dotted terminal of winding 63 and the collector is connected through a diode 62 to the undotted terminal of the winding 63. When a "high" dc control signal is applied between the base and emitter of transistor 61, permitting the transistor 61 to conduct, the winding 63 strongly loads the regenerative leg of the core. This prevents the transistor 17 from going into the regenerative cycle and stops operation. With transistor 17 quiescent, the transistor 61 does not quench the relaxation oscillator but the transistor 17 is prevented from igniting, even when trigger pulses are applied.

Figure 7:
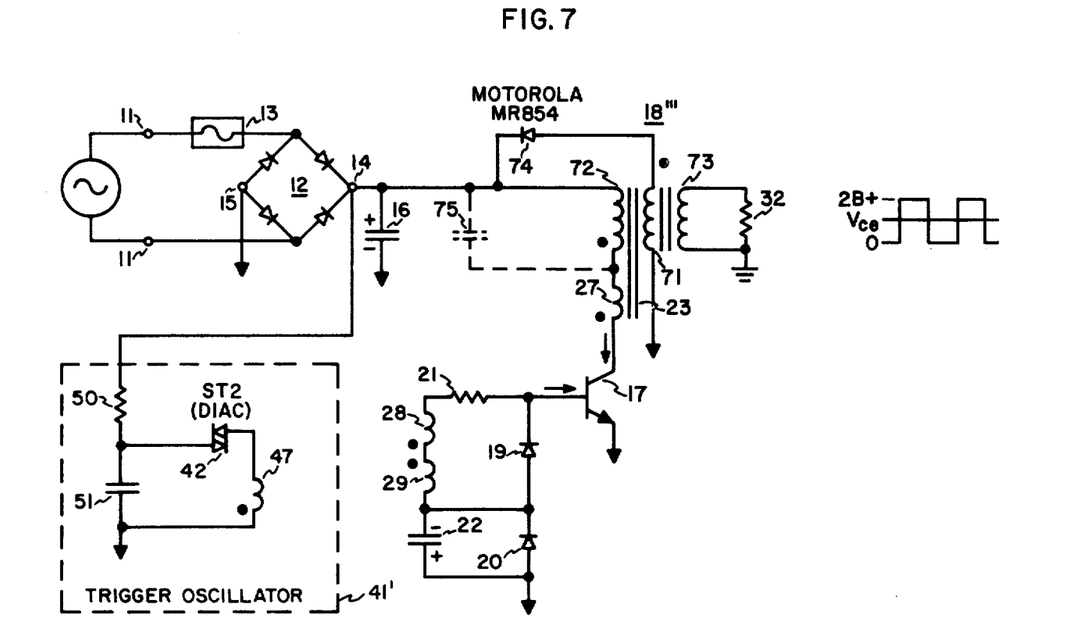
FIG. 7 is an electrical circuit diagram of a triggered run, clamped blocking oscillator.

The invention is also applicable to a triggered, driven forward converter and/or clamped blocking oscillator. With the capacitor 75 in FIG. 7 removed, the arrangement becomes a forward converter in which the flyback energy is returned to the dc source. The passive means for protection of the power transistor from the potential high voltage surge includes the diode 74 and an additional winding 71. In the FIG. 7 circuit, the base and emitter circuit of the power transistor and the trigger circuit may be as illustrated in FIG. 5. The trigger oscillator of FIG. 7 turns on the main power transistor once per operating cycle in the same manner illustrated in FIG. 5. (The FIG. 1 circuit may also be modified for free running operation.) The collector circuit and the transformer of FIG. 7 is modified with respect to the FIG. 5 illustration. More particularly, the resonating capacitor 31 may be removed or of reduced value and a third winding 71 is introduced closely coupled to the primary winding 72 and the secondary winding 73. The three windings (71-73) are wound upon one another (trifilarly) on the same leg of the core for maximum coupling. The undotted terminal of winding 71 is returned to ground and the dotted terminal is coupled to the anode of a diode whose cathode is coupled to the positive bridge terminal 14. During oscillation, when the power transistor 17 becomes nonconductive, the field established by winding 72 collapses about the winding 71 making the dotted terminal more positive than the dc source and allowing the energy to be fed back into the power supply through the diode 74. The power output waveform may take the form of a clamped blocking oscillator waveform with the clipping level established by the turns ratio between windings 72 and 71. With a unitary turns ratio, the positive voltage is approximately double the dc bridge potential. The presence of capacitance 75 of adequate size to resonate with the primary inductance tends to make the circuit a hybrid between a blocking oscillator and a forward converter and may be referred to as a clamped blocking oscillator. Some small capacitance is normally required in each circuit format to suppress high frequency parasitics or to reduce the rate of rise of the transistor 17 voltage waveform. The feedback windings associated with the core aperture prevent severe high current stressing or reverse secondary breakdown during turn off. The diversion of flyback energy away from transistor 17 and its reinjection into the dc source by the diode 74 reduces the voltage stress on the transistor.

Figure 8:
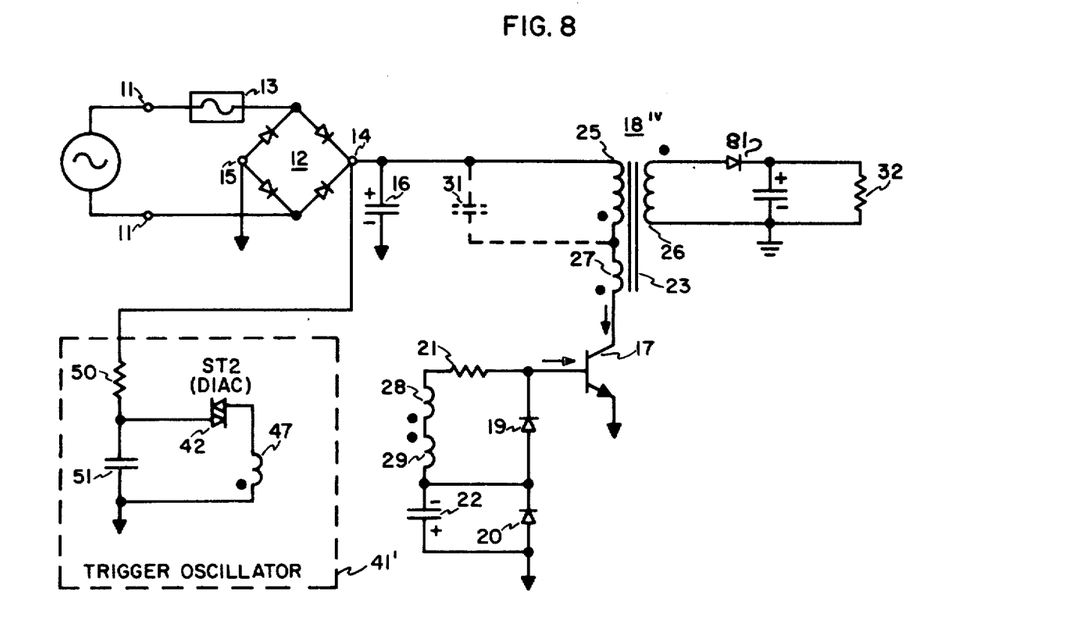
FIG. 8 is an electrical circuit diagram of a triggered run, flyback generator.

FIG. 8 illustrates the application of the invention to a triggered, driven flyback generator. The device is also known as a ring choke converter. The flyback generator may be distinguished from the other configurations in that a diode is provided (81) which applies energy to the load primarily during flyback. The device operates with a trigger and with a base control circuit similar to that shown in FIG. 7. In addition, a small capacity may be provided in shunt with the power primary winding for reduction of high frequency parasitics. The transformer construction may be of the same as employed in the FIG. 7 configuration with the primary and main secondary power windings being wound together on the leftmost leg of the core so as to effect maximum mutual coupling. The shape of the output waveform depends very much upon the amount of loading and duty cycle, and may be approximately rectangular or sinusoidal. As in the prior configuration, the feedback windings associated with the aperture prevent full core saturation and prevent high current stressing or reverse secondary breakdown. The discharge of the flyback pulse into the load protects the transistor from the stresses normally associated with discharge of the flyback pulse.

In the single transistor static inverters herein described, power levels on the order of 100 watts are contemplated with a range extending down to a few watts and up to a half kilowatt. In the 100 watt range, the power transistor may take the form of a low cost power transistor such as might be employed in the scanning circuit of a television receiver. Low cost power transistors are normally subject to appreciable stored charge and the turn off provided by the successive reduction in regenerative feedback and the application of degenerative feedback to terminate conduction tied to imminent core saturation prevents the transistor from ever driving the core into full saturation, and the resultant high current stressing. The arrangement thus permits one to maximize the power output from a given core size and from a given transistor capability.

Power transistors have several applicable operating limitations, or ratings, which may not be exceeded without a loss in reliability. Should the flyback be exceeded, destructive "punch through" may occur. The flyback voltage is controlled by adjustment of shunt capacitor value, the circuit Q and the winding turns. When the transistor is delivering current to the transformer winding, should the full core become saturated and the winding impedance fall, there is a danger that the current will exceed the maximum current ratings and cause destructive heat dissipation. A further danger is one of foward secondary breakdown, which depends on the turn on schedule as the voltage across the transistor is being reduced while the current may be increasing. Another requirement, the reverse secondary breakdown requirement, must be met as the blocking oscillator is being turned off. Here the current is decreasing, the voltage is increasing and the base current is negative (compared to a normal conduction mode).

The single transistor static inverter circuits require energy treatment distinct from that of plural transistor inverters. In conventional two transistor inverters, the flyback energy may be returned to the source or to turn on the other transistor. In a typical single transistor configuration, as exemplified by a blocking oscillator, the energy stored in the magnetic field of the inductor and released when the transistor becomes non-conductive must be managed in such a way as to avoid destruction of the transistor. The provision of a capacitor which resonates with the inductance prevents the energy from being dissipated in the transistor and effectively stores it in the tank circuit. The flyback energy may also be diverted from the transistor by adding a third winding with a diode poled to reinsert the flyback energy into the power supply (FIG. 7). One may also serially connect the load with a diode poled so that power is extracted during flyback (FIG. 8). Assuming that the energy management is such as to prevent exceeding the transistor operating limitations mentioned above, it is still essential that the transistor be turned off in a sequence providing minimum stressing and maximum switching efficiency. This is provided by the controlled feedback provided by the apertured core configuration common to all figures.

While the single transistor static inverters herein described have each employed NPN junction transistors as the gain elements used to switch the current in the inductor, the invention is also applicable to PNP devices and to field effect transistors as well and to other types of gain elements. Field effect transistors are normally restricted to low power applications. When substituted for a junction transistor, as for instance in the FIG. 1 embodiment, the source of the field effect transistor is connected to ground, the gate electrode is connected to the same circuit point as the base electrode of the transistor and the drain is connected to the same circuit point as the collector of the transistor. In order to provide a path for reverse current flow, a diode should be added to the circuit between source and drain electrodes, poled to allow current to flow from ground into the serially connected windings 27 and 25. To facilitate control action by the feedback windings 28 and 29, a resistance reducing the impedance presented to the feedback windings should be provided connected between gate and source electrodes. The field effect transistors having the most promise for these applications are the V-MOS field effect transistors, the "V" implying a v groove design. In addition, other gain elements may also be used, usually with minor circuit modification. Such gain elements include SCR's, gate turn off SCR's, and similar types of thyristors.

While the invention has been shown and described with an inductor whose composite core consists of two "C" cores, other core configurations are possible. For instance, one core may be a "C" core and the other an "I" core. Also, the composite core may have multiply closed loops. For instance, the main flux path may be branched by use of two "E" cores or an "E" core and an "I" core. If the primary and secondary windings are to be loosely coupled with appreciable leakage reactance between them, then the primary and secondary should be would on remote legs and a central or shunt leg usually of lesser cross section will be provided, and the aperture, through which the feedback windings are threaded, is preferably located between the leg under the primary winding and the shunt. If primary and secondary windings are to be closely coupled, then the central leg may have a cross-section double that of the outer legs and both primary and secondary windings should be placed in the central leg. In the last example, the aperture should be placed in the central leg. A suitable C core for operation at 40 KHz is the Ferrox cube 1F31-3C8.

While the invention has been shown in association with a core saturation sensing mechanism involving a single aperture, a feedback control winding and serial regenerative and degenerative windings, it should be apparent that other core state sensing mechanisms may be employed which provide the required sequential reduction in regenerative feedback at one stage of partial core saturation.

What is claimed as new and desired to be secured by Letters Patent of the United States is:

1. A static inverter comprising:
   A. input terminals for connection to a source of dc potentials,
   B. an inductor having:
      1. a core of substantially linear magnetic material having a closed main magnetic path and including a small aperture in a segment of said path which partitions the cross-section of said main magnetic path into two branches and creates a low reluctance closed flux path,
      2. a primary power winding encircling the full core cross-section for generating flux around said main magnetic path,
      3. a feedback control winding encircling one of said branches for generating a flux around said low reluctance closed path having the same direction as said main flux in a first branch and an opposite direction in the second branch,
      4. a second feedback winding encircling said first branch,
      5. a third feedback winding encircling said second branch,
   C. an electrical gain element having control, common and output electrodes for intermittent energization of said inductor from said dc source,
   said primary power winding, said feedback control winding, and said gain element being serially connected between said dc input terminals so that normal conduction by said gain element causes flux along said main magnetic path in a first direction, storing magnetic energy, and non-conduction by said gain element causes said main flux to collapse, releasing magnetic energy and creating a high voltage surge,
   said second and third feedback windings being serially connected between said control and common electrodes, said second feedback winding in a sense to increase gain element conduction and said third feedback winding in a sense to decrease gain element conduction when the flux in said main magnetic path increases in said first direction and in the same sense in respect to flux encircling said low reluctance flux path, said three feedback windings forming a current transformer providing feedback in a sense to increase gain element conduction as the main flux in said first direction increases until saturation of said first branch prevents further current transformer action, said first branch saturation preventing further induction in said second feedback winding, and inducing a voltage in said third feedback winding in a sense to turn off said gain element,
   D. means coupled to said inductor for deriving an output when said gain element is turned on and off, and
   E. passive means for protecting said gain element from the inductive surge and energy released when said gain element is turned off.

2. A static inverter as set forth in claim 1 wherein
said gain element is a first junction transistor whose base, emitter and collector electrodes correspond to the control, common and output electrodes respectively of said gain element.

3. A static inverter as set forth in claim 2 wherein
said passive protection means is a capacitor connected in shunt with said inductor to form an LC tank circuit, said capacitor storing energy released from said inductor when said transistor is turned off and returning energy to said inductor for turning said transistor back on to continue a regenerative cycle.

4. A static inverter as in claim 3 wherein
said inductor, upon turn off of said transistor, charges said capacitor, which is discharging through said inductor, forward biases the transistor output junction, producing abnormal forward conduction, said abnormal forward conduction establishing a reverse magnetization around said low reluctance flux path, storing energy releasable in a regenerative sense and creating stored charge in said transistor to institute normal transistor conduction with the restoration of normal inverse collector voltage as the capacitive discharge is complete, to continue the regenerative cycle.

5. A static inverter as set forth in claim 4 wherein
A. said core is provided with an air gap in said main magnetic path to minimize the effects of dc drive, and wherein
B. said alternating output means is a secondary winding remotely positioned on said core from said primary winding to increase leakage reactance and decrease coupling to facilitate free running operation.

6. A static inverter as set forth in claim 5 wherein
a first diode is provided connected in shunt with said base and emitter electrode in a sense to conduct current during abnormal forward conduction between said base and collector electrodes.

7. A static inverter as set forth in claim 5 wherein
A. a first diode is provided connected in shunt with said second and third feedback windings,
B. a second diode is provided connected in series with and in the same sense as said first diode, said two diodes being connected in shunt with said base and emitter electrodes, and a capacitor is provided connected in shunt with said second diode of sufficient capacity to retain a back dc bias when the regenerative cycle is established.

8. A static inverter as set forth in claim 7 wherein a resistance is provided in series with said second and third feedback windings, said three last recited elements being connected in shunt with said first diode.

9. A static inverter as set forth in claim 7 wherein oscillation starting means are provided comprising a resistance connected between a dc source terminal and said base electrode to forward bias the input junction and turn the transistor on when dc source potentials are first applied or when the regenerative cycle is interrupted.

10. A static inverter as set forth in claim 7 wherein oscillation starting means are provided, comprising:
 A. a starting winding encircling one of said branches for creating a flux in said low reluctance closed flux path to induce a voltage in said second and third feedback windings, and
 B. means for generating a trigger pulse in said starting winding in a sense to turn on said transistor when the regenerative cycle is to be started.

11. A static inverter as set forth in claim 10 wherein said trigger pulse generating means comprises:
 A. a resistor,
 B. a capacitor connected in series with said resistor between said dc input terminals,
 C. a diac having a breakdown potential less than said dc source potential, connected in series with said starting winding, the diac and starting winding being connected in shunt with said capacitor,
 D. a second, control transistor having its emitter coupled to one capacitor terminal, its collector coupled to the other capacitor terminal and its base connected to the connection between said diac and said starting winding,
the charge on said capacitor increasing when dc source potentials are first applied until the voltage breakdown potential of said diac is exceeded, the resultant conduction by said diac discharging said capacitor through said starting winding and creating a starting pulse to turn on said control transistor to periodically discharge said capacitor and prevent said diac discharge from occurring when the regenerative cycle is established.

12. A static inverter as set forth in claim 10 wherein said trigger pulse generating means comprises:
 A. a resistor,
 B. a capacitor connected in series with said dc input terminals, and
 C. a diac having a breakdown potential less than said dc source potential, connected in series with said starting winding, the diac and starting winding being connected in shunt with said capacitor,
the voltage on said capacitor recurrently increasing until the voltage breakdown of said diac is exceeded, the resultant conduction by said diac discharging said capacitor through said starting winding for creating a triggering pulse to turn on said first transistor, the time constant of said resistor and capacitor establishing said desired cyclical conduction rate.

13. A static inverter as set forth in claim 1 wherein
 A. said alternating output means is a secondary winding tightly coupling said load to said primary winding to prevent free running operation, and
 B. means are provided for periodically turning said power transistor on and off comprising:
  1. a triggering winding encircling one of said branches in said low reluctance path to induce a voltage in said second and third feedback windings to turn on said first transistor, and
  2. means are provided for generating a trigger pulse in said ignition winding in a sense to turn on said first transistor conduction at a desired cyclical rate.

14. A static inverter as set forth in claim 1 wherein
 A. said alternating output means is a secondary winding encircling the full core cross-section, and
 B. said passive protection means comprises:
  1. an additional winding encircling said primary power winding, said primary power winding, said secondary winding and said additional winding being closely coupled to one another, and
  2. a diode connected in series with said additional winding across said dc input terminals in a polarity to return energy to said dc source when said first transistor becomes non-conductive.

15. A static inverter as set forth in claim 1 for a dc load wherein
 A. said alternating output means is a secondary winding encircling the full core cross-section, closely coupled to said primary winding, and
 B. said passive protection means comprises:
  1. a diode connected in series with said load across said secondary winding, and
  2. a capacitor connected in shunt with said load,
said diode being poled to block current to said load when said transistor is conductive and to pass current when said first transistor is non-conductive, said capacitor retaining a charge between transistor conduction intervals to produce a dc output voltage.

16. A static inverter comprising:
 A. input terminals for connection to a source of dc potentials,
 B. an inductor having:
  1. a core of substantially linear magnetic material having a closed main magnetic path and including a small aperture in a segment of said path which partitions the cross-section of said main magnetic path into two branches and creates a low reluctance closed flux path,
  2. a primary power winding encircling the full core cross-section for generating flux around said main magnetic path,
  3. primary and secondary feedback winding means associated with said aperture for deriving an output in one sense until a branch saturates and in another sense after branch saturation as the main flux increases in a first direction,
 C. an electrical gain element having control, common and output electrodes for intermittent energization of said dc inductor from said dc source,
said primary power winding, said primary feedback winding, and said gain element being connected between said dc input terminals so that normal conduction by said gain element causes flux in said low reluctance closed path and along said main magnetic path in said first direction, storing magnetic energy, and non-conduction by said gain element causes said main flux to collapse, releasing magnetic energy and creating a high voltage source, said secondary feedback winding means being connected between said control and common electrodes in a sense to increase gain element conduction prior to said branch saturation and in a sense to decrease gain element conduction after branch saturation to turn off said gain element prior to full core saturation, D. means coupled to said inductor for deriving an output when said gain element is turned on and off, and E. passive means for protecting said gain element from the inductive surge and energy released when said gain element is turned off.

17. A static inverter as set forth in claim 16 wherein said primary feedback winding means consists of a winding encircling one of said branches which generates a flux around said low reluctance closed path having the same direction as said main flux in a first branch and an opposite direction in a second branch, predisposing said first branch to prior saturation, and wherein said secondary feedback winding means comprises a winding forming a virtual current transformer with said primary winding for deriving an output in said one sense, the effectiveness of said virtual transformer being reduced upon saturation of said first branch.

18. A static inverter as set forth in claim 17 wherein said secondary feedback winding means comprises a winding associated with a branch to which main flux is directed upon saturation of said first branch to achieve virtual voltage transformer action acting in said other sense.

* * * * *